(12) United States Patent
Kamiyoshi et al.

(10) Patent No.: US 8,211,827 B2
(45) Date of Patent: Jul. 3, 2012

(54) DYE RECEPTOR LAYER COMPOSITIONS

(75) Inventors: Nobumichi Kamiyoshi, Wakayama (JP);
Takashi Mukai, Wakayama (JP);
Shinichi Sata, Wakayama (JP)

(73) Assignee: KAO Corporation, Tokyo (JP)

( * ) Notice: Subject to any disclaimer, the term of this patent is extended or adjusted under 35 U.S.C. 154(b) by 785 days.

(21) Appl. No.: 12/274,720

(22) Filed: Nov. 20, 2008

(65) Prior Publication Data
US 2009/0142520 A1 Jun. 4, 2009

(30) Foreign Application Priority Data

Nov. 30, 2007 (JP) ................................ 2007-310436
May 16, 2008 (JP) ................................ 2008-129463

(51) Int. Cl.
*B41M 5/035* (2006.01)
*B41M 5/50* (2006.01)
*C08C 19/22* (2006.01)
*C08G 63/02* (2006.01)
*C08G 63/16* (2006.01)

(52) U.S. Cl. ........ 503/227; 427/146; 525/375; 528/176; 528/272; 528/302

(58) Field of Classification Search .................. None
See application file for complete search history.

(56) References Cited

U.S. PATENT DOCUMENTS

| 5,069,944 A | * | 12/1991 | Yamagishi et al. | ........... 427/444 |
| 5,457,081 A | * | 10/1995 | Takiguchi et al. | ............. 503/227 |
| 2005/0181150 A1 | * | 8/2005 | Aono | ......................... 428/32.34 |

FOREIGN PATENT DOCUMENTS

JP 2001-329054 11/2001

OTHER PUBLICATIONS

U.S. Appl. No. 12/190,714, filed Aug. 13, 2008, Kamiyoshi, et al.
Office Action issued Apr. 17, 2012, in Japanese application No. 2008-129463 (with English translation).

* cited by examiner

*Primary Examiner* — Bruce H Hess
(74) *Attorney, Agent, or Firm* — Oblon, Spivak, McClelland, Maier & Neustadt, L.L.P.

(57) ABSTRACT

The present invention relates to a dye receptor layer composition for thermal transfer image-receiving sheets which includes (a) a resin dispersion containing a polyester-containing resin, (b) a glycol ether having a boiling point of from 160° C. to 280° C. and a vapor pressure at 20° C. of from 20 to 1,000 Pa and (c) an oxazoline group-containing compound, and is excellent in film-forming property; and a thermal transfer image-receiving sheet obtained from the composition which can be dried at a low temperature for a short period of time, exhibits a low heat fusibility, is excellent in releasability, printing sensitivity and imaging performance, and can produce images with a high density.

21 Claims, No Drawings

DYE RECEPTOR LAYER COMPOSITIONS

FIELD OF THE INVENTION

The present invention relates to dye receptor layer compositions and thermal transfer dye image-receiving sheets using the compositions.

BACKGROUND OF THE INVENTION

There has been proposed the method for forming color images on a thermal transfer image-receiving sheet which is dyeable with a sublimable dye by using a thermal transfer sheet composed of the sublimable dye as a recording agent and a substrate on which the sublimable dye is supported. In this method, the dye is heated using a thermal head of a printer as a heating means and transferred on the image-receiving sheet to obtain the color images. The thus formed images are very clear and excellent in transparency because of the dye used, and are therefore expected to provide high-quality images which are excellent in reproducibility of half tones and gradation.

In the production of the thermal transfer image-receiving sheet, a film-forming assistant is usually used for enhancing a film-forming property of a dye receptor layer capable of receiving the sublimable dye, when applying a coating material for the dye receptor layer onto the substrate to form the layer.

As the thermal transfer image-receiving sheet produced by using the film-forming assistant, there is disclosed, for example, a heat-sensitive thermal transfer image-receiving sheet in which a dye receptor layer containing a polymer latex which is formed from an aqueous coating material, and a heat-insulating layer containing a hollow polymer, are formed on a substrate, and any one of the constitutional layers disposed on the side of the dye receptor layer is obtained by applying a coating solution containing an organic solvent having a boiling point of from 140° C. to 220° C. in an amount of 3% or less on the basis of whole solid components in the coating solution (JP 2007-190910A).

SUMMARY OF THE INVENTION

Thus, the present invention relates to the following aspects (1) to (4).

(1) A dye receptor layer composition for thermal transfer image-receiving sheets which includes (a) a resin dispersion containing a polyester-containing resin, (b) a glycol ether having a boiling point of from 160° C. to 280° C. and a vapor pressure at 20° C. of from 20 to 1,000 Pa and (c) an oxazoline group-containing compound.

(2) A process for producing a dye receptor layer composition for thermal transfer image-receiving sheets, which includes the steps of:

(I) preparing a resin dispersion containing a polyester-containing resin in an aqueous medium; and (II) mixing (a) the resin dispersion containing a polyester-containing resin which is obtained in the step (I), (b) a glycol ether having a boiling point of from 160° C. to 280° C. and a vapor pressure at 20° C. of from 20 to 1,000 Pa and (c) an oxazoline group-containing compound with each other.

(3) A thermal transfer image-receiving sheet which includes a substrate, and a dye receptor layer formed on the substrate which contains the dye receptor layer composition as defined in the above aspect (1).

(4) A process for producing a thermal transfer image-receiving sheet, which includes the steps of:

(I) preparing a resin dispersion containing a polyester-containing resin in an aqueous medium;

(II) mixing (a) the resin dispersion containing a polyester-containing resin which is obtained in the step (I), (b) a glycol ether having a boiling point of from 160° C. to 280° C. and a vapor pressure at 20° C. of from 20 to 1,000 Pa and (c) an oxazoline group-containing compound with each other to prepare a dye receptor layer composition; and (III) forming a dye receptor layer containing the dye receptor layer composition obtained in the step (II), on a substrate.

DETAILED DESCRIPTION OF THE INVENTION

In the techniques described in JP 2007-190910A in which the thermal transfer image-receiving sheet is produced by using a film-forming assistant for enhancing a film-forming property of the dye receptor layer, a prolonged drying procedure is required at a low temperature, resulting in unsatisfactory productivity. In addition, the resulting image-receiving sheet tends to incur heat fusion with a thermal transfer sheet carrying a sublimable dye (heat fusibility), and the heat-fused image-receiving sheet and thermal transfer sheet tend to be hardly peeled and separated from each other, resulting in poor imaging performance.

Thus, the present invention provides a thermal transfer image-receiving sheet which is capable of being dried at a low temperature and for a short period of time, exhibiting a low heat fusibility (excellent peelability), an excellent printing sensitivity and an excellent imaging performance, and producing images with a high density; and a dye receptor layer composition having an excellent film-forming property which is used in the thermal transfer image-receiving sheet.

[Dye Receptor Layer Composition]

The dye receptor layer composition for thermal transfer image-receiving sheets according to the present invention includes (a) a resin dispersion containing a polyester-containing resin, (b) a glycol ether having a boiling point of from 160° C. to 280° C. and a vapor pressure at 20° C. of from 20 to 1,000 Pa and (c) an oxazoline group-containing compound. The dye receptor layer may be formed by applying a coating solution containing the dye receptor layer composition on a substrate and then drying the applied coating solution.

((a) Resin Dispersion Containing Polyester-Containing Resin)

In the present invention, the resin dispersion may be prepared by the method of emulsifying the polyester-containing resin, the method of emulsifying and dispersing a polycondensable monomer in an aqueous medium, for example, by mechanical shearing or application of ultrasonic wave, etc. From the viewpoint of obtaining resin particles having a small particle size, the resin dispersion is preferably prepared by the method of emulsifying the polyester-containing resin.

Polyester-Containing Resin

The polyester is not particularly limited, and may be produced by polycondensing a known alcohol component and a known carboxylic acid component as raw materials.

Examples of the alcohol component as the raw monomer used for forming the polyester include ethylene glycol, propylene glycol, an alkylene oxide adduct of 2,2-bis(4-hydroxyphenyl)propane, glycerol, pentaerythritol, trimethylol propane, hydrogenated bisphenol A, sorbitol, and alkylene ($C_2$ to $C_4$) oxide adducts (average molar number of addition: 1 to 16) of these compounds. These alcohol components may be used alone or in combination of any two or more thereof.

In the present invention, from the viewpoints of a low heat fusibility and a good dyeability of the thermal transfer image-receiving sheet, the raw alcohol component used for forming the polyester is preferably the alkylene oxide adduct of 2,2-bis(4-hydroxyphenyl)propane represented by the following formula (I):

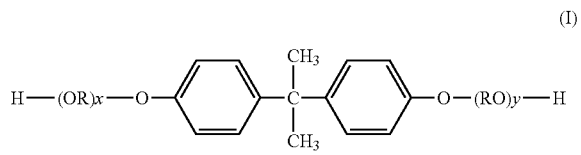

wherein RO is an oxyalkylene group; R is an ethylene group and/or a propylene group; and x and y each represent a molar number of addition of alkylene oxides, and are respectively a positive number, with the proviso that a sum of x and y is from 2 to 7 on the average.

From the same viewpoints as described above, the content of the alkylene oxide adduct of 2,2-bis(4-hydroxyphenyl)propane represented by the above formula (I) in the raw alcohol component is preferably 50 mol % or higher, more preferably 70 mol % or higher, even more preferably 80 mol % or higher and most preferably 100 mol %.

In the above general formula (I), RO is an oxyalkylene group; R is an ethylene group and/or a propylene group; and x and y each represent a molar number of addition of alkylene oxides, and are respectively a positive number. Although the respective R groups may be the same or different, a sum of x and y is from 2 to 7 and preferably from 2 to 5 on the average from the viewpoint of a good reactivity with the carboxylic acid component.

Specific examples of the alkylene oxide adduct of 2,2-bis(4-hydroxyphenyl)propane represented by the above general formula (I) include polyoxypropylene-2,2-bis(hydroxyphenyl)propane and polyoxyethylene-2,2-bis(hydroxyphenyl)propane which have the molar number of addition of alkylene oxides within the above-specified range.

In the present invention, from the viewpoint of a good releasability of the thermal transfer image-receiving sheet, a trivalent or higher-valent alcohol is preferably used as the above alcohol component. Specific examples of the preferred trivalent or higher-valent alcohol include glycerol and pentaerythritol.

Specific examples of the raw carboxylic acid component include dicarboxylic acids such as phthalic acid, isophthalic acid, terephthalic acid, fumaric acid, maleic acid, adipic acid and succinic acid; succinic acids substituted with an alkyl group having 1 to 20 carbon atoms or an alkenyl group having 2 to 20 carbon atoms such as dodecenyl succinic acid and octenyl succinic acid; trivalent or higher-valent polycarboxylic acids such as trimellitic acid and pyromellitic acid; and anhydrides and alkyl ($C_1$ to $C_3$) esters of these acids. The carboxylic acid component preferably contains an aromatic carboxylic acid from the viewpoints of good releasability and dyeability of the thermal transfer image-receiving sheet. Specific examples of the preferred aromatic carboxylic acid include phthalic acid, isophthalic acid and terephthalic acid. The content of the aromatic carboxylic acid in the carboxylic acid component is preferably 50 mol % or higher and more preferably 60 mol % or higher on the basis of the whole carboxylic acids contained therein. These carboxylic acid components may be used alone or in combination of any two or more thereof.

In the present invention, from the viewpoints of a good releasability of the thermal transfer image-receiving sheet, a trivalent or higher-valent carboxylic acid is preferably used as the carboxylic acid component. More specifically, as the trivalent or higher-valent carboxylic acid, preferred are trimellitic acid and pyromellitic acid, and more preferred is trimellitic acid.

In the present invention, from the viewpoint of a good dyeability of the thermal transfer image-receiving sheet, among these carboxylic acid components, preferred are the succinic acids containing an alkyl group and/or an alkenyl group. The alkyl group may be either linear or branched, and preferably has 1 to 22 carbon atoms, more preferably 8 to 22 carbon atoms and even more preferably 10 to 20 carbon atoms. The cycloalkyl group preferably has 5 to 20 carbon atoms and more preferably 8 to 20 carbon atoms. The alkenyl group may be either linear or branched, and preferably has 2 to 22 carbon atoms, more preferably 8 to 22 carbon atoms and even more preferably 10 to 20 carbon atoms. The cycloalkenyl group preferably has 5 to 20 carbon atoms and more preferably 8 to 20 carbon atoms. Among these succinic acids containing an alkyl group and/or an alkenyl group, preferred are dodecenyl succinic acid and octenyl succinic acid.

Specific examples of the alkyl group contained in the succinic acid containing an alkyl group and/or an alkenyl group include various octyl groups, various decyl groups, various dodecyl groups, various tetradecyl groups, various hexadecyl groups, various octadecyl groups and various icosyl groups.

Specific examples of the alkenyl group contained in the succinic acid containing an alkyl group and/or an alkenyl group include various octenyl groups, various decenyl groups, various dodecenyl groups, various tetradecenyl groups, various hexadecenyl groups, various octadecenyl groups and various icosenyl groups.

The content of the succinic acid containing an alkyl group and/or an alkenyl group in the carboxylic acid component is preferably from 5 to 50 mol % in order to enhance a dyeability of the resulting thermal transfer image-receiving sheet. The reason therefor is considered as follows. That is, the alkyl group and/or the alkenyl group present in a side chain of the succinic acid serves for reducing an interaction between molecules of the polyester, so that dyes can penetrate to an inside of the polyester. From the viewpoint of a good penetrability of the dyes into the polyester, i.e., a good dyeability of the thermal transfer image-receiving sheet, the content of the succinic acid containing an alkyl group and/or an alkenyl group in the carboxylic acid component is more preferably from 10 to 40 mol % and even more preferably from 20 to 40 mol %.

The polyester may be produced, for example, by polycondensing the alcohol component and the carboxylic acid component in an inert gas atmosphere at a temperature of 180 to 250° C., if required, in the presence of an esterification catalyst. From the viewpoints of good releasability and dyeability of the thermal transfer image-receiving sheet of the present invention, the raw polyester preferably has a broad molecular weight distribution, and further is preferably produced by polycondensation using an esterification catalyst. Examples of the esterification catalyst include tin catalysts, titanium catalysts, and metal compounds such as antimony trioxide, zinc acetate and germanium dioxide. Among these esterification catalysts, the tin catalysts and titanium catalysts are preferred from the viewpoints of a good reactivity upon the polycondensation and good imaging characteristics of a thermal transfer image-receiving sheet produced by using the resulting polyester. Also, among the tin catalysts, preferred are dibutyl tin oxide and tin compounds containing no Sn—C bond, specifically, such as tin octylate.

From the viewpoints of good releasability and dyeability of the thermal transfer image-receiving sheet, the polyester used in the present invention preferably has a softening point of from 80 to 250° C. and more preferably from 120 to 250° C., and a glass transition point of from 50 to 85° C. Also, from the viewpoint of a good dispersibility, i.e., a good emulsifiability, of the polyester-containing resin in an aqueous medium, the polyester preferably has an acid value of from 1 to 35 mg KOH/g and more preferably from 5 to 35 mg KOH/g. Meanwhile, the desirable glass transition point, softening point and acid value of the polyester can be attained by adequately controlling kinds and blending ratios of the monomers used as well as reaction temperature and time used in the polycondensation.

In addition, from the viewpoint of a good film-forming property upon producing the thermal transfer image-receiving sheet, the number-average molecular weight of the polyester is preferably from 1,000 to 10,000 and more preferably from 2,000 to 8,000.

Meanwhile, in the present invention, as the polyester, there may also be used modified polyesters which are obtained by modifying the polyester to such an extent that the properties of the polyester are still kept within the above-specified ranges substantially without deterioration thereof. Examples of the modified polyesters include polyesters which are grafted or blocked with phenol, urethane, epoxy, etc., by the methods described in JP 11-133668A, JP 10-239903A, JP 8-20636A, etc., and composite resins having two or more kinds of resin units including polyester units.

Examples of the resins usable together with the polyester in the polyester-containing resin include known resins usable in the dye receptor layer of the thermal transfer image-receiving sheet such as, for example, polyolefin-based resins such as polypropylene, halogenated polymers such as polyvinyl chloride and polyvinylidene chloride, vinyl polymers such as polyvinyl acetate, polyacrylic esters and polyvinyl acetal, polystyrene-based resins, polyamide-based resins, copolymer-based resins of olefins such as ethylene and propylene with other vinyl monomers, ionomers, cellulose-based resins such as cellulose diacetate, and polycarbonates. Among these resins, preferred are polyvinyl chloride and polycarbonates from the viewpoints of a good releasability and a good dyeability of the resulting thermal transfer image-receiving sheet.

In the present invention, the polyester-containing resin is preferably in the form of resin particles in a resin dispersion which is obtained by dispersing the resin particles in an aqueous medium, i.e., is preferably incorporated together with a releasing agent, etc., in the resin dispersion, from the viewpoint of a good environmental suitability. The content of the polyester in the polyester-containing resin is preferably 70% by weight or more, more preferably 80% by weight or more and most preferably 100% by weight from the viewpoint of a good dyeability of the thermal transfer image-receiving sheet.

Resin Dispersion

The aqueous medium used for dispersing the polyester-containing resin contains water as a main component, i.e., in an amount of 50% by weight or more. From the viewpoint of a good environmental suitability, the content of water in the aqueous medium is preferably 80% by weight or more, more preferably 90% by weight and most preferably 100% by weight. Examples of components other than water which may be contained in the aqueous medium include water-soluble organic solvents such as methanol, ethanol, isopropanol, butanol, acetone, methyl ethyl ketone and tetrahydrofuran.

The volume-median particle size ($D_{50}$) of the resin particles contained in the resin dispersion in which the polyester-containing resin is dispersed, is preferably 1 μm or less, more preferably from 20 nm to 1 μm and even more preferably from 50 to 800 nm from the viewpoint of a good film-forming property upon producing the thermal transfer image-receiving sheet. Meanwhile, the "volume-median particle size ($D_{50}$)" as used herein means a particle size at which a cumulative volume frequency calculated on the basis of a volume fraction of particles from a smaller particle size side thereof is 50%, and may be measured by the below-mentioned method.

From the viewpoint of a good dyeability of the thermal transfer image-receiving sheet, the content of the polyester-containing resin in a solid component of the resin dispersion is preferably from 80 to 100% by weight, more preferably from 85 to 100% by weight and even more preferably from 90 to 100% by weight.

The resin dispersion may be produced by the method of dissolving the polyester-containing resin in a ketone-based solvent, adding a neutralizing agent to the resultant solution to ionize a carboxyl group contained in the polyester-containing resin, and then adding water to the thus neutralized solution, followed by distilling off the ketone-based solvent therefrom to convert the resultant reaction solution to an aqueous phase. More specifically, for example, using a reactor equipped with a stirrer, a reflux condenser, a thermometer, a dropping funnel and a nitrogen gas inlet tube, the solution prepared by dissolving the polyester-containing resin in the ketone-based solvent is mixed with the neutralizing agent, etc., to ionize a carboxyl group contained in the polyester-containing resin (not required when the carboxyl group is already ionized), and then water is added to the obtained reaction solution, followed by distilling off the ketone-based solvent therefrom to convert the reaction solution to an aqueous phase. The dissolution in the ketone-based solvent and addition of the neutralizing agent are usually conducted at a temperature not higher than a boiling point of the ketone-based solvent. Also, examples of the water used in the above method include deionized water.

Examples of the ketone-based solvent usable in the above method include acetone, methyl ethyl ketone, diethyl ketone, dipropyl ketone, methyl isobutyl ketone and methyl isopropyl ketone. Among these ketone-based solvents, methyl ethyl ketone is preferred from the viewpoints of a good solubility of the resin therein and facilitated removal of the solvent by distillation.

Examples of the neutralizing agent include an aqueous ammonia solution, an aqueous solution of alkali such as sodium hydroxide, and amines such as allyl amine, isopropyl amine, diisopropyl amine, ethyl amine, diethyl amine, triethyl amine, 2-ethylhexyl amine, 3-ethoxypropyl amine, diisobutyl amine, 3-diethylaminopropyl amine, tri-n-octyl amine, t-butyl amine, sec-butyl amine, propyl amine, methylaminopropyl amine, dimethylaminopropyl amine, n-propanol amine, butanol amine, 2-amino-4-pentanol, 2-amino-3-hexanol, 5-amino-4-octanol, 3-amino-3-methyl-2-butanol, monoethanol amine, N,N-dimethyl ethanol amine, isopropanol amine, neopentanol amine, diglycol amine, ethylene diamine, 1,3-diaminopropane, 1,2-diaminopropane, 1,6-diaminohexane, 1,9-diaminononane, 1,12-diaminodecane, dimerized aliphatic acid diamine, 2,2,4-trimethylhexamethylene diamine, 2,4,4-trimethylhexamethylene diamine, hexamethylene diamine, N-aminoethyl piperazine, N-aminopropyl piperazine, N-aminopropyl dipiperidinopropane and piperazine. From the viewpoints of a good emulsifiability of the resins and a good volatility, among these neutralizing agents, preferred is ammonia. The neutralizing agent may be used in such an amount capable of neutralizing at least an acid value of the polyester-containing resin.

The solid component of the resin dispersion has a glass transition point of preferably from 40 to 80° C. and more preferably from 50 to 75° C., and a softening point of preferably from 80 to 250° C. and more preferably from 100 to 220° C. from the viewpoints of a good storage stability of the resin dispersion as well as a good storage stability and a good releasability of the thermal transfer image-receiving sheet obtained from the resin dispersion. The number-average molecular weight of the solid component is the same as the molecular weight of the above polyester.

The concentration of the solid component in the resin dispersion is preferably from 20 to 45% by weight, more preferably from 25 to 40% by weight and even more preferably from 30 to 40% by weight from the viewpoint of a good productivity. In addition, the pH of the above resin dispersion as measured at 25° C. is preferably from 5 to 10, more preferably from 6 to 9 and even more preferably from 7 to 9 from the viewpoint of a good storage stability of the resin dispersion.

((b) Glycol Ethers)

The dye receptor layer composition of the present invention contains a glycol ether having a boiling point of from 160° C. to 280° C. and a vapor pressure at 20° C. of from 20 to 1,000 Pa. In the present invention, by using the film-forming assistant whose boiling point and vapor pressure lie within the above adequate ranges, it is possible to obtain a dye receptor layer composition having an excellent film-forming property which can be dried at a low temperature and for a short period of time, and further to obtain a thermal transfer image-receiving sheet having a low heat fusibility (excellent releasability) and an excellent printing sensitivity which is capable of producing images with a high density. The reason therefor is considered as follows. That is, since the glycol ether used in the present invention has a high boiling point and is volatilized upon drying owing to a high volatility thereof, the resulting thermal transfer image-receiving sheet is substantially free from the residual glycol ether, so that molecules of the polyester are strongly bonded to each other, resulting in further enhancement of a film-forming property of the dye receptor layer composition.

Form the viewpoint of a good film-forming property of the dye receptor layer composition, the glycol ether used in the present invention preferably has a boiling point of from 170 to 270° C., more preferably from 170 to 260° C., even more preferably from 170 to 210° C. and further even more preferably from 180 to 200° C. From the viewpoint of a good volatility, the vapor pressure at 20° C. of the glycol ether is preferably 30 Pa or higher, more preferably 40 Pa or higher, even more preferably 50 Pa or higher and further even more preferably 70 Pa or higher, and also is preferably 500 Pa or lower, more preferably 200 Pa or lower and even more preferably 100 Pa or lower.

The end hydroxyl groups of the glycol ether are preferably substituted with a suitable group from the viewpoints of a good volatility and a good film-forming property of the dye receptor layer composition. Examples of the preferred substituent group include an alkyl group having 1 to 4 carbon atoms, an alkenyl group having 2 to 4 carbon atoms and an acetyl group. As the glycol ether, ethylene glycol monobutyl ether acetate (boiling point: 192° C.; vapor pressure: 31 Pa), diethylene glycol diethyl ether (boiling point: 188° C.; vapor pressure: 79 Pa), etc., are preferred from the viewpoints of good film-forming property and volatility.

The content of the glycol ether in the dye receptor layer composition is preferably from 0.1 to 30% by weight, more preferably from 1 to 30% by weight and even more preferably from 1 to 20% by weight on the basis of whole solid resin components contained in the composition from the viewpoints of a good volatility of the glycol ether and a good film-forming property of the dye receptor layer composition.

In the present invention, the glycol ether is preferably used in the form of a mixture with the resin dispersion and/or the oxazoline group-containing compound. The glycol ether may be added to the resin dispersion either during or after production of the resin dispersion, but is preferably added thereto after production of the resin dispersion from the viewpoint of a good productivity. In the present invention, the glycol ether is more preferably added to a dispersion obtained by mixing the resin dispersion with the oxazoline group-containing compound from the viewpoint of a good crosslinking reactivity between the oxazoline group-containing compound and the polyester-containing resin.

Also, from the viewpoint of a good stability of the resin dispersion upon mixing, the glycol ether is preferably diluted with water. The dilution of the glycol ether with water may be carried out, for example, by mixing the glycol ether with water. By using the resin dispersion thus improved in stability upon mixing, occurrence of aggregates therein is suppressed, and the thermal transfer image-receiving sheet obtained from the resulting dye receptor layer composition is free from irregularities on a printing surface thereof and, therefore, has a smooth printing surface, thereby enabling formation of images with a high density. From the viewpoints of a good productivity, a good stability of the resin dispersion and a good image quality formed on the thermal transfer image-receiving sheet, the glycol ether is used in the form of a mixed solution with water in which the mixing ratio of the glycol ether to water (glycol ether/water; in terms of a weight ratio) is preferably from 20/80 to 80/20, more preferably from 25/75 to 75/25, even more preferably from 30/70 to 70/30 and further even more preferably from 40/60 to 60/40.

The temperature of the reaction system used upon mixing the glycol ether with the resin dispersion and/or the oxazoline group-containing compound (when both the resin dispersion and the oxazoline group-containing compound are mixed with the glycol ether, the latter means a mixed dispersion composed of both the components; this is similarly applied to subsequent descriptions) is preferably from 5 to 50° C., more preferably from 5 to 40° C. and even more preferably from 5 to 35° C. from the viewpoints of a good miscibility between the glycol ether and the resin dispersion and a good dispersibility of the resin dispersion. More specifically, the glycol ether and the respective dispersions may be added and mixed with each other in the above-specified temperature range. The velocity of addition of the film-forming assistant to the resin dispersion and/or the oxazoline group-containing compound is optional, and the film-forming assistant is preferably added to the resin dispersion and/or the oxazoline group-containing compound while stirring from the viewpoint of uniformly mixing these components.

((c) Oxazoline Group-Containing Compound)

The dye receptor layer composition of the present invention contains the oxazoline group-containing compound in order to improve a releasability and a heat fusibility between the thermal transfer image-receiving sheet and the transfer sheet carrying a sublimable dye thereon, as well as enhance an image density and an image quality.

As the oxazoline group-containing compound (hereinafter occasionally referred to merely as an "oxazoline compound"), there may be used those compounds containing a plurality of oxazoline groups in a molecule thereof. Examples of the compounds containing a plurality of oxazoline groups in a molecule thereof include difunctional-type compounds such as 2,2-(1,3-phenylene)-bis 2-oxazoline and 2,2-(1,4-phenylene)-bis 2-oxazoline; and polyfunctional-type compounds obtained by polymerizing a polymerizable monomer containing an oxazoline group (hereinafter occasionally referred to merely as "oxazoline polymers"). Among these oxazoline compounds, from the viewpoint of a good crosslinking reactivity with the polyester-containing resin, preferred are the oxazoline polymers.

When using the oxazoline compound, it is considered that the crosslinking effect due to the reaction with the polyester-containing resin is effectively exhibited, and the crosslinking reaction is promoted, so that the molecular weight of the resin forming the resin dispersion is increased, thereby improving a releasability and a heat fusibility between the thermal transfer image-receiving sheet and the transfer sheet carrying the sublimable dye. The oxazoline polymers may be produced, for example, by polymerizing an oxazoline group-containing polymerizable monomer. The oxazoline polymers may also be produced by copolymerizing the oxazoline group-containing polymerizable monomer, if required, with a polymerizable monomer containing no oxazoline group which is copolymerizable therewith.

Examples of the oxazoline group-containing polymerizable monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline and 2-isopropenyl-5-ethyl-2-oxazoline. These oxazoline group-containing polymerizable monomers may be used alone or in combination of any two or more thereof. Among these oxazoline group-containing polymerizable monomers, 2-isopropenyl-2-oxazoline is preferred from the viewpoint of a good industrial availability.

Examples of the polymerizable monomer containing no oxazoline group include (meth)acrylic acid esters such as methyl(meth)acrylate, ethyl (meth)acrylate, n-butyl(meth)acrylate, isobutyl(meth)acrylate, t-butyl (meth)acrylate, cyclohexyl(meth)acrylate, 2-ethylhexyl(meth)acrylate, methoxy polyethylene glycol (meth)acrylate, lauryl(meth) acrylate, stearyl(meth)acrylate, 2-hydroxyethyl(meth)acrylate, 2-hydroxypropyl(meth)acrylate, monoesters of (meth) acrylic acid and polyethylene glycol, 2-aminoethyl(meth) acrylate and salts thereof, caprolactone-modified products of (meth)acrylic acid, 2,2,6,6-tetramethyl piperidine (meth) acrylate and 1,2,2,6,6-pentamethyl piperidine (meth)acrylate; (meth)acrylic acid salts such as sodium (meth)acrylate, potassium (meth)acrylate and ammonium (meth)acrylate; unsaturated nitriles such as acrylonitrile and methacrylonitrile; unsaturated amides such as (meth)acrylamide, N-methylol (meth)acrylamide and N-(2-hydroxyethyl) (meth) acrylamide; vinyl esters such as vinyl acetate and vinyl propionate; vinyl ethers such as methyl vinyl ether and ethyl vinyl ether; α-olefins such as ethylene and propylene; halogen-containing α,β-unsaturated aliphatic hydrocarbons such as vinyl chloride, vinylidene chloride and vinyl fluoride; and α,β-unsaturated aromatic hydrocarbons such as styrene, vinyl benzene, α-methyl styrene and sodium styrene sulfonate. These monomers may be used alone or in combination of any two or more thereof.

The oxazoline polymers preferably have a weight-average molecular weight of from 500 to 2,000,000 and more preferably from 1,000 to 1,000,000 from the viewpoints of a good crosslinking reactivity with the resin particles and a good productivity.

In the present invention, the oxazoline compound may be used in the form of particles, but is preferably used in the form of a solution or dispersion prepared by dissolving or dispersing the oxazoline compound in an aqueous medium from the viewpoints of a good crosslinking reactivity with the polyester-containing resin and a good productivity. When using the oxazoline compound in the form of a dispersion in the aqueous medium, the volume-median particle size ($D_{50}$) of the dispersed particles of the oxazoline compound is preferably from 0.02 to 1 μm and more preferably from 0.05 to 0.8 μm from the viewpoint of a good crosslinking reactivity with the polyester-containing resin. As the aqueous medium in which the oxazoline compound is dispersed or dissolved, there may be used the same aqueous media as described previously.

Meanwhile, examples of ordinary commercial products of the oxazoline compound usable in the present invention include "EPOCROSS (registered trademark) WS SERIES" (water-soluble type) and "EPOCROSS K SERIES" (emulsion type) both available from Nippon Catalyst Co., Ltd.

The content of the oxazoline compound in the dye receptor layer composition or the amount of the oxazoline compound added thereto is preferably from 0.1 to 30 parts by weight and more preferably from 1 to 20 parts by weight in terms of a solid content on the basis of 100 parts by weight of the polyester-containing resin from the viewpoints of a good crosslinking reactivity with the polyester-containing resin and a good productivity.

The oxazoline compound may be applied in the form of a coating solution together with the resin dispersion, the glycol ether, etc., onto a substrate. Alternatively, the oxazoline compound may be previously mixed with the resin dispersion and the glycol ether to form a coating solution, and the resulting coating solution may be applied onto the substrate. When previously mixing these components, it is preferred that the glycol ether, etc., be added to a mixture obtained by mixing the resin dispersion with the oxazoline compound. Upon mixing, the resin dispersion and the oxazoline compound are mixed with each other in an aqueous medium while keeping the reaction system at a temperature of preferably from 20 to 100° C. and more preferably 70 to 98° C. More specifically, a mixture composed of the resin dispersion and the oxazoline compound may be heated to the above-specified temperature range.

When being mixed under heating at the above temperature, at least a part of the polyester is appropriately crosslinked with the oxazoline compound. That is, in the present invention, an adequate amount of the oxazoline compound is added to the resin dispersion, and mixed therewith at a desired temperature, whereby a part of the polyester-containing resin particles dispersed in the resin dispersion are crosslinked. In general, since the molecular weight of a polyester is increased when subjected to crosslinking reaction, the obtained crosslinked polyester tends to be enhanced in releasability but deteriorated in film-forming property. However, in the present invention, it is considered that the polyester-containing resin particles are mainly subjected to crosslinking reaction only in the vicinity of a surface thereof. Therefore, owing to an interaction between the non-crosslinked polyester being still present within the resin particles and the film-forming assistant, it is considered that both a good releasability and a good film-forming property can be achieved.

Therefore, the dye receptor layer composition of the present invention preferably contains a crosslinked polyester obtained by crosslinking at least a part of the polyester with at least a part of the oxazoline group-containing compound.

The presence of the crosslinked polyester in the polyester-containing resin obtained owing to the oxazoline compound may be identified by analyzing whether any amide group produced by the crosslinking reaction is present in the resin. Meanwhile, in order to enhance the detection sensitivity, the presence of the crosslinked polyester may also be identified by drying an insoluble component extracted from the resin with tetrahydrofuran (THF) using a Soxhlet extractor and then analyzing the dried component by FT-IR ATR (attenuated total reflection) method.

(Other Components)

The dye receptor layer composition of the present invention preferably contains a releasing agent in addition to the resin dispersion, glycol ether and oxazoline compound. As the releasing agent, there are preferably used, for example, a colloid solution of fine particles of water-dispersible or water-soluble modified silicone oil and/or silicic anhydride (e.g., colloidal silica), etc. The weight-average particle size of the fine particles of the silicic anhydride dispersed in the colloid solution is preferably 100 nm or less from the viewpoint of a good dispersibility thereof in the thermal transfer image-receiving sheet. More preferably, there is used colloidal silica having a weight-average particle size of 20 nm or less. Further, the dye receptor layer composition may also contain, in addition to the above releasing agent, the other releasing agent such as polyethylene and polypropylene. From the viewpoints of a good releasability and a good dyeability of the thermal transfer image-receiving sheet, the content of the releasing agent in the dye receptor layer composition is preferably from 0.1 to 20 parts by weight and more preferably from 0.5 to 10 parts by weight on the basis of 100 parts by weight of the polyester-containing resin.

The dye receptor layer composition of the present invention preferably contains a pigment or a filler such as titanium oxide, zinc oxide, kaolin clay, calcium carbonate and silica fine particles from the viewpoint of improving a whiteness of the dye receptor layer and enhancing a clarity of transferred images. The content of the pigment or filler in the dye receptor layer composition is from 0.1 to 20 parts by weight and preferably from 0.1 to 10 parts by weight on the basis of 100 parts by weight of the polyester-containing resin from the viewpoint of a good whiteness of the thermal transfer image-receiving sheet.

The dye receptor layer composition of the present invention may further contain, if required, other additives such as, for example, film-forming assistants other than the above glycol ethers, crosslinking agents other than the oxazoline compounds, curing agents and catalysts.

Meanwhile, in the dye receptor layer composition, the resulting polyester-containing resin preferably exhibits a self-dispersibility, and preferably contains no surfactant from the viewpoint of improving a hydrophobic property of the thermal transfer image-receiving sheet.

[Thermal Transfer Image-Receiving Sheet]

The thermal transfer image-receiving sheet of the present invention includes a substrate and a dye receptor layer formed on the substrate which contains the above dye receptor layer composition.

(Substrate)

Examples of the substrate usable in the present invention include synthetic papers (such as polyolefin-based papers and polystyrene-based papers), wood-free papers, art papers, coated papers, cast coated papers, wall papers, backing papers, synthetic resin- or emulsion-impregnated papers, synthetic rubber latex-impregnated papers, synthetic resin-internally added papers, paper boards, cellulose fiber papers, and films or sheets made of various resins such as polyolefins, polyvinyl chloride, polyethylene terephthalate, polystyrene, polymethacrylate and polycarbonates. Further, as the substrate, there may also be used white opaque films produced by shaping a mixture of these resins with a white pigment or a filler into a film, or foamed sheets, as well as laminates composed of combination of these substrates.

The thickness of these substrates is not particularly limited, and is generally from about 10 to about 300 µm. The substrates are preferably subjected to surface treatments such as primer treatment and corona discharge treatment from the viewpoint of enhancing an adhesion thereof to the dye receptor layer.

(Dye Receptor Layer)

The dye receptor layer may be formed by applying the coating solution containing the above dye receptor layer composition on the substrate, as described above, for example, by a gravure printing method, a screen printing method, a reverse roll coating method using a gravure printing plate, etc., and drying the obtained coating layer. The thickness of the thus formed dye receptor layer is not particularly limited, and is generally from 1 to 50 µm, and preferably from 3 to 15 µm from the viewpoints of a good image quality and a good productivity. In addition, the solid content in the coating layer after dried is preferably from 3 to 15 g per 1 $m^2$ of the obtained dye receptor layer.

The dye receptor layer may also include a release layer containing a releasing agent from the viewpoint of further enhancing a releasability of the thermal transfer image-receiving sheet upon the transfer. The release layer is preferably formed from various modified silicones such as polyether-modified silicones, hydroxy-modified silicones, amino-modified silicones, carboxy-modified silicones and mercapto-modified silicones. These modified silicones may be crosslinked using a crosslinking agent, if required.

The thermal transfer image-receiving sheet of the present invention is provided on at least one surface of the substrate with the above dye receptor layer t.

[Process for Producing Dye Receptor Layer Composition and Process for Producing Thermal Transfer Image-Receiving Sheet]

The process for producing the dye receptor layer composition according to the present invention includes the steps of (I) preparing a resin dispersion containing a polyester-containing resin in an aqueous medium; and (II) mixing (a) the resin dispersion obtained in the step (I), (b) a glycol ether having a boiling point of from 160° C. to 280° C. and a vapor pressure at 20° C. of from 20 to 1,000 Pa and (c) an oxazoline group-containing compound with each other. Also, the process for producing a thermal transfer image-receiving sheet according to the present invention includes the steps of (I) preparing a resin dispersion containing a polyester-containing resin in an aqueous medium; (II) mixing (a) the resin dispersion obtained in the step (I), (b) a glycol ether having a boiling point of from 160° C. to 280° C. and a vapor pressure at 20° C. of from 20 to 1,000 Pa and (c) an oxazoline group-containing compound with each other to prepare a dye receptor layer composition; and (III) forming a dye receptor layer containing the dye receptor layer composition obtained in the step (II), on a substrate.

The polyester-containing resin, the resin dispersion and the method of preparing the resin dispersion containing the polyester-containing resin in the aqueous medium as used in the step (I); the glycol ether and the oxazoline group-containing compound as used in the step (II); and further the substrate, the dye receptor layer, etc., as used in the step (III) are the same as described above. In addition, the method of mixing the resin dispersion, the glycol ether and the oxazoline group-containing compound, and the method of forming the dye receptor layer on the substrate are also the same as described above. In the present invention, the glycol ether (b) used in the step (II) is preferably diluted with water. The dilution of the glycol ether with water may be carried out, for example, by mixing the glycol ether with water. From the viewpoints of a good productivity, a good stability of the resin dispersion and a good image quality formed on the thermal transfer image-receiving sheet, the glycol ether is preferably used in the form of a mixed solution with water in which the mixing ratio of the glycol ether to water (glycol ether/water; in terms of a weight ratio) is preferably from 20/80 to 80/20, more preferably from 25/75 to 75/25, even more preferably from 30/70 to 70/30 and further even more preferably from 40/60 to 60/40.

[Thermal Transfer Method]

In the present invention, a transfer sheet carrying a sublimable dye is pressed under heating on the surface of the dye receptor layer of the thermal transfer image receiving sheet obtained by forming the dye receptor layer on the substrate, to allow the dye to transfer to the dye receptor layer, thereby obtaining a transferred image.

The transfer sheet used upon conducting a thermal transfer procedure using the above thermal transfer image-receiving sheet containing the dye receptor layer composition according to the present invention is usually in the form of a sheet obtained by forming a dye layer containing a sublimable dye on a paper or a polyester film, and there may be used any of conventionally known transfer sheets.

Examples of the sublimable dye suitably used for the thermal transfer image-receiving sheet of the present invention include yellow dyes such as pyridone-azo-based dyes, dicyano-styryl-based dyes, quinophthalone-based dyes and merocyanine-based dyes; magenta dyes such as benzene-azo-based dyes, pyrazolone-azomethine-based dyes, isothiazole-based dyes and pyrazolo-triazole-based dyes; cyan dyes such as anthraquinone-based dyes, cyano-methylene-based dyes, indophenol-based dyes and indonaphthol-based dyes.

As the method for applying a heat energy upon the thermal transfer, there may be used any of conventionally known methods, for example, the method of applying a heat energy of from about 5 to about 100 mJ/mm$^2$ by controlling a recording time using a recording apparatus such as a thermal printer.

In accordance with the present invention, there are provided a thermal transfer image-receiving sheet which can be dried at a low temperature and for a short period of time and can exhibit a low heat fusibility, and a dye receptor layer composition used in the thermal transfer image-receiving sheet. Also, there are provided a thermal transfer image-receiving sheet which is excellent in releasability, printing sensitivity and imaging performance and can produce images with a high density, and a dye receptor layer composition having an excellent film-forming property which is used in the thermal transfer image-receiving sheet. Therefore, the thermal transfer image-receiving sheet using the dye receptor layer composition of the present invention can be suitably used as a thermal transfer image-receiving sheet capable of exhibiting an excellent image performance.

The present invention is described in more detail below by referring to the following examples, etc. However, it should be noted that these examples are only illustrative and not intended to limit the invention thereto. In the following examples, etc., various properties were measured and evaluated by the following methods.

[Acid Value of Resins]

The acid value of resins was measured according to JIS $K_{0070}$. However, with respect to the solvent used upon the measurement, the mixed solvent of ethanol and ether was replaced with a mixed solvent containing acetone and toluene at a volume ratio (acetone/toluene) of 1:1.

[Softening Point and Glass Transition Point of Polyesters]

(1) Softening Point

Using a flow tester "CFT-500D" available from Shimadzu Seisakusho Co., Ltd., 1 g of a sample was extruded through a nozzle having a die pore diameter of 1 mm and a length of 1 mm while heating at a temperature rise rate of 6° C./min and applying a load of 1.96 MPa thereto by a plunger. The softening point was determined as the temperature at which a half the amount of the sample was flowed out when plotting a downward movement of the plunger of the flow tester relative to the temperature.

(2) Glass Transition Point

Using a differential scanning calorimeter ("Pyris 6DSC" available from Perkin Elmer, Inc.), a sample was heated to 200° C. and then cooled from 200° C. to 0° C. at a temperature drop rate of 10° C./min, and thereafter heated again at temperature rise rate of 10° C./min. The temperature at which an extension of a baseline below a maximum peak temperature observed in the endothermic curve was intersected with a tangential line having a maximum inclination of the curve in a region of from a rise-up portion of the peak to an apex of the peak was read as the glass transition point.

[Number-Average Molecular Weight of Resins]

The number-average molecular weight of resins was calculated from the molecular weight distribution measured by gel permeation chromatography according to the following method.

(1) Preparation of Sample Solution

The resin was dissolved in tetrahydrofuran (THF) to prepare a solution having a concentration of 0.5 g/100 mL. The resultant solution was then filtered through a fluororesin filter ("FP-200" available from Sumitomo Electric Industries, Co., Ltd.) having a pore size of 2 µm to remove insoluble components therefrom, thereby preparing a sample solution.

(2) Measurement of Molecular Weight Distribution

Using the below-mentioned analyzer, THF was allowed to flow therethrough at a rate of 1 mL/min, and the column was stabilized in a thermostat at 40° C. One-hundred microliters of the sample solution was injected into the column to measure a molecular weight distribution thereof. The molecular weight of the sample was calculated on the basis of a calibration curve previously prepared. The calibration curve of the molecular weight was prepared by using several kinds of monodisperse polystyrenes (those polystyrenes having molecular weights of $2.63 \times 10^3$, $2.06 \times 10^4$ and $1.02 \times 10^5$ available from Tosoh Corp.; and those polystyrenes having molecular weights of $2.10 \times 10^3$, $7.00 \times 10^3$ and $5.04 \times 10^4$ available from GL Science Co., Ltd.) as standard samples.

Analyzer: CO-8010 (available from Tosoh Corp.)

Column: GMHLX+G3000HXL (available from Tosoh Corp.)

[Particle Size of Polyester-Containing Resin Particles in Resin Dispersion]

The particle size of resin particles was measured using a laser diffraction particle size analyzer ("LA-920" available from HORIBA Co., Ltd.). That is, a cell for the measurement was filled with distilled water, and a volume median particle size ($D_{50}$) of the resin particles was measured at a concentration at which an absorbance thereof was fallen within an adequate range.

[Solid Concentration in Resin Dispersion]

Using an infrared moisture meter ("FD-230" available from Ketto Science Laboratory Co., Ltd.), 5 g of the dispersion was dried at 150° C., and the water content (%) thereof on a wet base was measured under a measuring mode 96 (monitoring time: 2.5 min; variation width: 0.05%). The solid concentration of each dispersion was calculated according to the following formula.

Solid Concentration (%)=100−$M$ wherein M is a water content (%) on a wet base represented by the following formula:

Water Content (%) on Wet Base=$[(W-W_0)/W]\times 100$ wherein W is a weight of the sample before measurement (initial weight of the sample); and $W_0$ is a weight of the sample after measurement (absolute dry weight of the sample).

Production Example 1

Production of Polyester (a)

A four-necked flask equipped with a nitrogen inlet tube, a dehydration tube, a stirrer and a thermocouple was charged with 17,500 g of polyoxypropylene(2.2)-2,2-bis(4-hydroxyphenyl)propane, 16,250 g of polyoxyethylene(2.0)-2,2-bis(4-hydroxyphenyl)propane, 11,454 g of terephthalic acid, 1,608 g of dodecenyl succinic anhydride, 4,800 g of trimellitic anhydride and 15 g of dibutyl tin oxide. The contents of the flask were reacted with each other at 220° C. in a nitrogen atmosphere while stirring until the softening point as measured according to ASTM D36-86 reached 120° C., thereby obtaining a polyester (a). As a result, it was confirmed that the thus obtained polyester (a) had a softening point of 125° C., a glass transition point of 65° C., an acid value of 19 mgKOH/g and a number-average molecular weight of 3580.

Production Example 2

Production of Polyester (b)

A four-necked flask equipped with a nitrogen inlet tube, a dehydration tube, a stirrer and a thermocouple was charged with 525 g of polyoxypropylene(2.2)-2,2-bis(4-hydroxyphenyl)propane, 1,950 g of polyoxyethylene(2.0)-2,2-bis(4-hydroxyphenyl)propane, 1,552 g of terephthalic acid, 138 g of glycerol and 21 g of tin octylate. The contents of the flask were reacted with each other at 220° C. in a nitrogen atmosphere while stirring until the softening point as measured according to ASTM D36-86 reached 120° C., thereby obtaining a polyester (b). As a result, it was confirmed that the thus obtained polyester (b) had a softening point of 121° C., a glass transition point of 73° C., an acid value of 21 mgKOH/g and a number-average molecular weight of 3870.

Production Example 3

Production of Polyester (c)

A four-necked flask equipped with a nitrogen inlet tube, a dehydration tube, a stirrer and a thermocouple was charged with 3920 g of polyoxypropylene(2.2)-2,2-bis(4-hydroxyphenyl)propane, 1560 g of polyoxyethylene(2.0)-2,2-bis(4-hydroxyphenyl)propane, 1672 g of dodecenyl succinic anhydride, 1354 g of terephthalic acid and 25 g of tin octylate. The contents of the flask were reacted with each other at 230° C. for 5 h under normal pressures in a nitrogen atmosphere, and further reacted under reduced pressure. Thereafter, 307 g of trimellitic anhydride was added to the obtained reaction mixture, and the resultant mixture was further reacted until the softening point as measured according to ASTM D36-86 reached 120° C., thereby obtaining a polyester (c). As a result, it was confirmed that the thus obtained polyester (c) had a softening point of 115° C., a glass transition point of 57° C., an acid value of 15 mgKOH/g and a number-average molecular weight of 4200.

Production Example 4

Production of Polyester-Containing Resin Dispersion (a)

A four-necked flask equipped with a nitrogen inlet tube, a reflux condenser, a stirrer and a thermocouple was charged with 300 g of the polyester (a), and the polyester (a) was dissolved in 540 g of methyl ethyl ketone at 25° C. Next, 6.95 g of a 25% ammonia aqueous solution was added to the obtained solution and further 716 g of deionized water was added thereto under stirring, and then methyl ethyl ketone was distilled off from the obtained reaction solution at 50° C. under reduced pressure, thereby obtaining a polyester dispersion (a). As a result, it was confirmed that the volume-median particle size of the resin particles dispersed in the thus obtained polyester dispersion (a) was 120 nm, the polyester dispersion (a) had a solid content of 29.7% and a pH of 7.6, and the resin particles had a softening point of 118° C. and a glass transition point of 61° C.

Production Example 5

Production of Polyester-Containing Resin Dispersion (b)

A four-necked flask equipped with a nitrogen inlet tube, a reflux condenser, a stirrer and a thermocouple was charged with 300 g of the polyester (a), and the polyester (a) was dissolved in 540 g of methyl ethyl ketone at 40° C. Next, 7.64 g of a 25% ammonia aqueous solution was added to the obtained solution and further 720 g of deionized water was added thereto under stirring, and then methyl ethyl ketone was distilled off from the obtained reaction solution at 50° C. under reduced pressure, thereby obtaining a resin dispersion (b). As a result, it was confirmed that the volume-median particle size of the resin particles dispersed in the thus obtained resin dispersion (b) was 610 nm, the resin dispersion (b) had a solid content of 30% by weight and a pH of 7.6, and the resin particles had a softening point of 120° C. and a glass transition point of 70° C.

Production Example 6

Production of Polyester-Containing Resin Dispersion (c)

A four-necked flask equipped with a nitrogen inlet tube, a reflux condenser, a stirrer and a thermocouple was charged with 2000 g of the polyester (c), and the polyester (c) was dissolved in 3600 g of methyl ethyl ketone at 25° C. Next, 32.5 g of a 25% ammonia aqueous solution was added to the obtained solution and further 4667 g of deionized water was added thereto under stirring, and then methyl ethyl ketone was distilled off from the obtained reaction solution at 50° C. under reduced pressure, thereby obtaining a resin dispersion (c). As a result, it was confirmed that the volume-median particle size of the resin particles dispersed in the thus obtained resin dispersion (c) was 125 nm, and the resin dispersion (c) had a solid content of 36% by weight and a pH of 7.7.

Production Example 7

Production of Mixed Dispersion A of Polyester-Containing Resin Dispersion (a) and Oxazoline Polymer A four-necked flask equipped with a nitrogen inlet tube, a reflux condenser, a stirrer and a thermocouple was charged with 700 g of the polyester-containing resin dispersion (a) and 62.29 g of an oxazoline polymer ("EPOCROSS WS-700" available from Nippon Catalyst Co., Ltd.; oxazoline group content in oxazoline polymer: 4.55 mmol/g; number-average molecular weight: 20,000; weight-average molecular weight: 40,000; used in the form of a 25% aqueous solution), and the contents of the flask were reacted with each other under stirring at 95° C. for 4 h, thereby obtaining a mixed dispersion A. As a result, it was confirmed that the volume-median particle size of the resin particles dispersed in the thus obtained mixed dispersion A was 120 nm, the mixed dispersion A had a solid content of 31.2% and a pH of 8.8, and the resin particles had a softening point of 225° C. and a glass transition point of 58° C.

Production Example 8

Production of Mixed Dispersion C of Polyester-Containing Resin Dispersion (c) and Oxazoline Polymer A four-necked flask equipped with a nitrogen inlet tube, a reflux condenser, a stirrer and a thermocouple was charged with 700 g of the polyester-containing resin dispersion (c) and 59.3 g of an oxazoline polymer ("EPOCROSS WS-700" available from Nippon Catalyst Co., Ltd.), and the contents of the flask were reacted with each other under stirring at 95° C. for 4 h, thereby obtaining a mixed dispersion C. As a result, it was confirmed that the volume-median particle size of the resin particles dispersed in the thus obtained mixed dispersion C was 107 nm, the mixed dispersion C had a solid content of 36.0% and a pH of 8.7, and the resin particles had a softening point of 219° C. and a glass transition point of 54° C.

Examples 1 to 6 and Comparative Examples 1 to 6

Production of Dye Receptor Layer Compositions A to L

The resin dispersion, the glycol ether shown in Table 1, and the releasing agent shown in Table 2, were mixed with each other at 25° C. in amounts as shown in Table 2, thereby obtaining dye receptor layer compositions A to L. Meanwhile, the numerals shown in Table 2 represent amounts of the respective components added which are expressed by number of grams.

TABLE 1

| Film-forming assistant | Compounds | Boiling point (° C.) | Vapor pressure (Pa) |
|---|---|---|---|
| a | Diethylene glycol diethyl ether | 188 | 79 |
| b | Ethylene glycol monobutyl ether acetate | 192 | 31 |
| c | Diethylene glycol monobutyl ether acetate | 246 | 5 |
| d | Diethylene glycol monobutyl ether | 231 | 3 |
| e | Diethylene glycol monoethyl ether | 203 | 13 |
| f | Diethylene glycol monoethyl ether acetate | 217 | 7 |
| g | Mixed solution of diethylene glycol diethyl ether and water (mixing ratio of diethylene glycol diethyl ether/water: 25/75) | 188* | 79* |
| h | Mixed solution of diethylene glycol diethyl ether and water (mixing ratio of diethylene glycol diethyl ether/water: 50/50) | 188* | 79* |
| i | Mixed solution of diethylene glycol diethyl ether and water (mixing ratio of diethylene glycol diethyl ether/water: 75/25) | 188* | 79* |

Note
*Boiling points and vapor pressures of the film-forming assistants g, h and i are values of diethylene glycol diethyl ether.

The dye receptor layer compositions A to L were each applied onto a synthetic paper "FGS250" available from UPO Corp., at 25° C. using a wire bar such that a coating amount thereof after drying was 5.0 g/m$^2$, and then dried at 50° C. for 2 min, thereby obtaining a thermal transfer image-receiving sheet. A black solid image was printed onto the thus obtained thermal transfer image-receiving sheet using a sublimation-type printer "SELPHY" available from Canon Corp. The printed papers provided thereon with the black solid image were respectively evaluated by measuring an image density, heat fusibility (releasability from the papers) and image quality (smoothness of surface of printed paper) by the following methods. The results are shown in Table 2.

Evaluation Methods

[Image Density]

The density of the black solid image printed was measured using a Gretag densitometer (available from GRETAG-MACBETH Corp.).

[Heat Fusibility (Evaluation of Releasability from Transfer Sheet)]

The heat fusibility as an index of releasability was determined from a sound generated when the ink ribbon was peeled from the dye image-receiving sheet upon printing the gradation pattern thereon, according to the following ratings.

1: No strange sound upon peeling, and no problems owing to heat fusion between the thermal transfer image-receiving sheet and the ink ribbon (Very excellent releasability).

2: Slight strange sound upon peeling, but no problems owing to heat fusion (Excellent releasability).

3: Heat fusion occurred with difficulty in peeling (Poor releasability)

[Image Quality (Smoothness of Surface of Printed Paper)]

Occurrence of aggregates owing to addition of the film-forming assistant was determined from irregularities on the surface of printed paper used in the above evaluation of images.

1: Very smooth surface condition when observed by naked eyes.

2: Small number of irregularities were observed by naked eyes, but a photograph of the surface of the printed paper showed that it was still practically utilizable without problems.

3: Considerable number of irregularities were observed by naked eyes, and a photograph of the surface of the printed paper showed that it was unpractical for use with problems.

TABLE 2-1

|  | Examples |  |  |  |  |  |
|---|---|---|---|---|---|---|
|  | 1 | 2 | 3 | 4 | 5 | 6 |
| Dye receptor layer composition | A | B | I | J | K | L |
| Mixed dispersion A of polyester-containing resin dispersion (a) and oxazoline polymer (controlled to solid content of 30%) | 2.5 | 2.5 | — | 2.5 | 2.5 | 2.5 |
| Mixed dispersion C of polyester-containing resin dispersion (c) and oxazoline polymer (controlled to solid content of 30%) | — | — | 2.5 | — | — | — |
| Polyester-containing resin dispersion (b) (controlled to solid content of 30%) | — | — | — | — | — | — |
| VINYBRANE 900*1 (controlled to solid content of 30%) Film-forming assistant | — | — | — | — | — | — |
| (a) | 0.12 | — | 0.12 | — | — | — |
| (b) | — | 0.12 | — | — | — | — |
| (c) | — | — | — | — | — | — |
| (d) | — | — | — | — | — | — |
| (e) | — | — | — | — | — | — |
| (f) | — | — | — | — | — | — |
| (g) | — | — | — | 0.48 | — | — |
| (h) | — | — | — | — | 0.24 | — |
| (i) | — | — | — | — | — | 0.16 |
| Releasing agent: KF615A*2 | 0.04 | 0.04 | 0.04 | 0.04 | 0.04 | 0.04 |
| Evaluation |  |  |  |  |  |  |
| Concentration | 1.41 | 1.62 | 1.68 | 1.52 | 1.50 | 1.51 |
| Heat Fusibility | 1 | 1 | 1 | 1 | 1 | 1 |
| Smoothness on surface of printed paper | 2 | 2 | 2 | 1 | 1 | 1 |

Note
*1VINYBRANE 900; vinyl chloride-vinyl acetate copolymer emulsion available from Nissin Chemical Industry, Co., Ltd.
*2KF615A; polyether-modified silicone available from Shin-Etsu Chemical Industry, Co., Ltd.

TABLE 2-2

|  | Comparative Examples |  |  |  |  |  |
|---|---|---|---|---|---|---|
|  | 1 | 2 | 3 | 4 | 5 | 6 |
| Dye receptor layer composition | C | D | E | F | G | H |
| Mixed dispersion A of polyester-containing resin dispersion (a) and oxazoline polymer (controlled to solid content of 30%) | 2.5 | 2.5 | 2.5 | 2.5 | — | — |
| Mixed dispersion C of polyester-containing resin dispersion (c) and oxazoline polymer (controlled to solid content of 30%) | — | — | — | — | — | — |
| Polyester-containing resin dispersion (b) (controlled to solid content of 30%) | — | — | — | — | 2.5 | — |
| VINYBRANE 900*1 (controlled to solid content of 30%) Film-forming assistant | — | — | — | — | — | 2.5 |
| (a) | — | — | — | — | 0.12 | — |
| (b) | — | — | — | — | — | — |
| (c) | 0.12 | — | — | — | — | — |
| (d) | — | 0.12 | — | — | — | — |
| (e) | — | — | 0.12 | — | — | — |
| (f) | — | — | — | 0.12 | — | 0.12 |
| (g) | — | — | — | — | — | — |
| (h) | — | — | — | — | — | — |
| (i) | — | — | — | — | — | — |
| Releasing agent: KF615A*2 | 0.04 | 0.04 | 0.04 | 0.04 | 0.04 | 0.04 |
| Evaluation |  |  |  |  |  |  |
| Concentration | — | — | — | — | — | 1.52 |
| Heat Fusibility | 3 | 3 | 3 | 3 | 3 | 3 |
| Smoothness on surface of printed paper | — | — | — | — | — | 3 |

Note
*1VINYBRANE 900; vinyl chloride-vinyl acetate copolymer emulsion available from Nissin Chemical Industry, Co., Ltd.
*2KF615A; polyether-modified silicone available from Shin-Etsu Chemical Industry, Co., Ltd.

The invention claimed is:

1. A dye receptor layer composition for thermal transfer image-receiving sheets, comprising:
   (a) a resin dispersion comprising a polyester-containing resin,
   (b) a glycol ether having a boiling point of from 160° C. to 280° C. and a vapor pressure at 20° C. of from 20 to 1,000 Pa, and
   (c) an oxazoline group-containing compound,
   wherein the polyester is produced by polycondensing an alcohol component with a carboxylic acid component which contains from 5 to 50 mol % of succinic acid containing an alkyl group and/or an alkenyl group.

2. The dye receptor layer composition according to claim 1, wherein the composition comprises a crosslinked polyester obtained by crosslinking at least a part of the polyester with at least a part of the oxazoline group-containing compound.

3. The dye receptor layer composition according to claim 1, wherein the polyester is produced by polycondensing an alcohol component with a carboxylic acid component containing 50 mol % or more of an aromatic dicarboxylic acid.

4. The dye receptor layer composition according to claim 1, wherein the alcohol component containing comprises 50 mol % or more of an alkylene oxide adduct of 2,2-bis(4-hydroxyphenyl)propane represented by the formula (I):

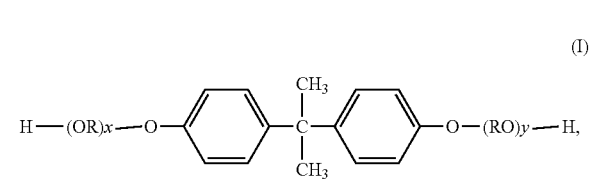

wherein RO is an oxyalkylene group; R is an ethylene group and/or a propylene group; and x and y each represent a molar number of addition of alkylene oxides, and are; respectively, a positive number, with the proviso that a sum of x and y is from 2 to 7 on average.

5. A thermal transfer image-receiving sheet comprising a substrate, and a dye receptor layer formed on the substrate which comprises the dye receptor layer composition according to claim 1.

6. The dye receptor layer composition according to claim 1, wherein a content of the polyester in the polyester-containing resin is 70 wt. % or more.

7. The dye receptor layer composition according to claim 1, wherein a concentration of solid components in the resin dispersion is from 20 to 45 wt. %.

8. The dye receptor layer composition according to claim 1, wherein a content of the glycol ether in the dye receptor layer composition is from 0.1 to 30 wt. % based on the total of solid resin components.

9. The dye receptor layer composition according to claim 1, wherein a mixing ratio of the glycol ether to water is from 20/80 to 80/20.

10. The dye receptor layer composition according to claim 1, wherein a content of the oxazoline group-containing compound is from 0.1 to 30 wt. %.

11. The dye receptor layer composition according to claim 1, wherein a content of the oxazoline group-containing compound is at least one polymer having a weigh-average molecular weight of from 500 to 2,000,000.

12. A process for producing a dye receptor layer composition for thermal transfer image-receiving sheets, the process comprising:
(I) preparing a resin dispersion containing a polyester-containing resin in an aqueous medium; and
(II) mixing
(a) the resin dispersion obtained in (I),
(b) a glycol ether having a boiling point of from 160° C. to 280° C. and a vapor pressure at 20° C. of from 20 to 1,000 Pa, and
(c) an oxazoline group-containing compound,
wherein the polyester is produced by polycondensing an alcohol component with a carboxylic acid component which contains from 5 to 50 mol % of succinic acid containing an alkyl group and/or an alkenyl group.

13. The process according to claim 12, wherein in (II), the glycol ether (b) having a boiling point of from 160° C. to 280° C. and a vapor pressure at 20° C. of from 20 to 1,000 Pa is mixed with water at a weight ratio of the glycol ether to water (glycol ether/water) of from 20/80 to 80/20 to form a mixed solution thereof.

14. A process for producing a thermal transfer image-receiving sheet, the process comprising:
(I) preparing a resin dispersion containing a polyester-containing resin in an aqueous medium;
(II) mixing
(a) the resin dispersion obtained in (I),
(b) a glycol ether having a boiling point of from 160° C. to 280° C. and a vapor pressure at 20° C. of from 20 to 1,000 Pa, and
(c) an oxazoline group-containing compound, thereby preparing a dye receptor layer composition; and
(III) forming a dye receptor layer containing the dye receptor layer composition obtained in (II), on a substrate,
wherein the polyester is produced by polycondensing an alcohol component with a carboxylic acid component which contains from 5 to 50 mol % of succinic acid containing an alkyl group and/or an alkenyl group.

15. A dye receptor layer composition for thermal transfer image-receiving sheets, comprising:
(a) a resin dispersion comprising a polyester-containing resin,
(b) a glycol ether having a boiling point of from 160° C. to 280° C. and a vapor pressure at 20° C. of from 20 to 1,000 Pa, and
(c) an oxazoline group-containing compound,
wherein the polyester contains a polyester obtained by polycondensing an alcohol component containing 50 mol % or more of an alkylene oxide adduct of 2,2-bis(4-hydroxyphenyl)propane represented by the formula (I):

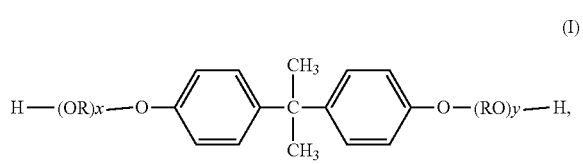

wherein RO is an oxyalkylene group; R is an ethylene group and/or a propylene group; and x and y each represent a molar number of addition of alkylene oxides, and are, respectively, a positive number, with the proviso that a sum of x and y is from 2 to 7 on average,
with a carboxylic acid component.

16. The dye receptor layer composition according to claim 15, wherein the composition comprises a crosslinked polyester obtained by crosslinking at least a part of the polyester with at least a part of the oxazoline group-containing compound.

17. The dye receptor layer composition according to claim 15, wherein the carboxylic acid component comprises 50 mol % or more of an aromatic dicarboxylic acid.

18. A thermal transfer image-receiving sheet comprising a substrate, and a dye receptor layer formed on the substrate which comprises the dye receptor layer composition according to claim 15.

19. A process for producing a dye receptor layer composition for thermal transfer image-receiving sheets, the process comprising:
(I) preparing a resin dispersion containing a polyester-containing resin in an aqueous medium; and
(II) mixing
(a) the resin dispersion obtained in (I),
(b) a glycol ether having a boiling point of from 160° C. to 280° C. and a vapor pressure at 20° C. of from 20 to 1,000 Pa, and
(c) an oxazoline group-containing compound,
wherein the polyester contains a polyester obtained by polycondensing an alcohol component containing 50 mol % or more of an alkylene oxide adduct of 2,2-bis(4-hydroxyphenyl)propane represented by the formula (I):

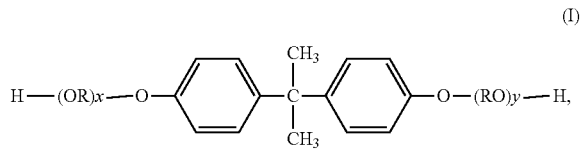

wherein RO is an oxyalkylene group; R is an ethylene group and/or a propylene group; and x and y each represent a molar number of addition of alkylene oxides, and are, respectively, a positive number, with the proviso that a sum of x and y is from 2 to 7 on average,
with a carboxylic acid component.

20. The process according to claim 19, wherein in (II), the glycol ether (b) having a boiling point of from 160° C. to 280° C. and a vapor pressure at 20° C. of from 20 to 1,000 Pa is mixed with water at a weight ratio of the glycol ether to water (glycol ether/water) of from 20/80 to 80/20 to form a mixed solution thereof.

21. A process for producing a thermal transfer image-receiving sheet, the process comprising:
(I) preparing a resin dispersion containing a polyester-containing resin in an aqueous medium;
(II) mixing
(a) the resin dispersion obtained in (I),
(b) a glycol ether having a boiling point of from 160° C. to 280° C. and a vapor pressure at 20° C. of from 20 to 1,000 Pa, and
(c) an oxazoline group-containing compound, thereby preparing a dye receptor layer composition; and
(III) forming a dye receptor layer containing the dye receptor layer composition obtained in (II), on a substrate, wherein the polyester contains a polyester obtained by polycondensing an alcohol component containing 50 mol % or more of an alkylene oxide adduct of 2,2-bis(4-hydroxyphenyl)propane represented by the formula (I):

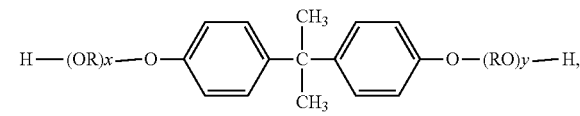

(I)

wherein RO is an oxyalkylene group; R is an ethylene group and/or a propylene group; and x and y each represent a molar number of addition of alkylene oxides, and are, respectively, a positive number, with the proviso that a sum of x and y is from 2 to 7 on average,
with a carboxylic acid component.

* * * * *